United States Patent [19]
Bethea et al.

[11] 4,199,698
[45] Apr. 22, 1980

[54] 2-METHYL-4-NITRO-ANILINE NONLINEAR OPTICAL DEVICES

[75] Inventors: Clyde G. Bethea, East Orange; Barry F. Levine, Livingston; Robert T. Lynch, Berkeley Heights; Carl D. Thurmond, Morristown, all of N.J.

[73] Assignee: Bell Telephone Laboratories, Incorporated, Murray Hill, N.J.

[21] Appl. No.: 967,688

[22] Filed: Dec. 8, 1978

[51] Int. Cl.$^2$ ............................................. H03F 7/00
[52] U.S. Cl. ................................. 307/425; 307/427; 307/428
[58] Field of Search ...................... 307/88.3, 425, 427, 307/428

[56] References Cited
PUBLICATIONS

"Journal of Applied Physics," 43, Jun. 1972, pp. 2765-2770.
"Journal of Applied Physics," 48, Jul. 1977, pp. 2699-2704.
"Chemical Physics Letters," 37, Feb. 1, 1976, pp. 516-520.
"Applied Physics Letters," 20, Jan. 1, 1972, pp. 21-23.

*Primary Examiner*—Rudolph V. Rolinec
*Assistant Examiner*—Darwin R. Hostetter
*Attorney, Agent, or Firm*—Richard D. Laumann

[57] ABSTRACT

Nonlinear devices using 2-methyl-4-nitroaniline are described. Devices using 2-methyl-4-nitroaniline as the active element include second harmonic generators, optical mixers and parametric oscillators which can be operated under phasematched conditions.

8 Claims, 3 Drawing Figures

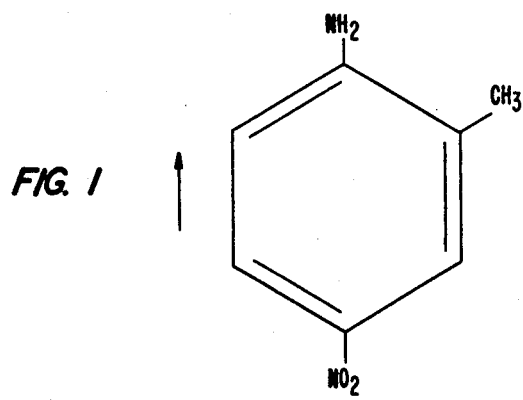
FIG. 1
FIG. 2
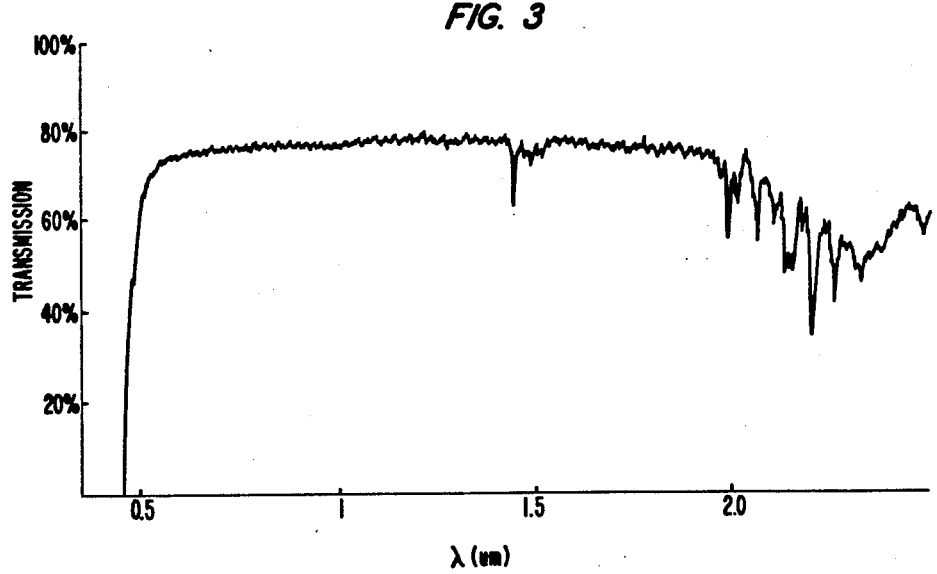
FIG. 3

2-METHYL-4-NITRO-ANILINE NONLINEAR OPTICAL DEVICES

TECHNICAL FIELD

This invention is concerned with nonlinear optical devices for the conversion of optical energy at one frequency to optical energy at another frequency.

BACKGROUND OF THE INVENTION

Nonlinear optical devices, e.g., frequency doublers, optical mixers and parametric oscillators, are of interest in both research and applied projects because of their ability to convert coherent optical radiation at one frequency into coherent optical radiation at another frequency. This ability is of interest because of the opportunities it affords both for expanding the number of wavelengths at which coherent radiation is available and for converting optical energy to a wavelength more convenient for device applications.

Many materials, such as quartz and lithium niobate, have nonlinear coefficients and exhibit optical nonlinearities. However, because the utility of the material for device applications is generally proportional, at least at relatively low levels of incident radiation, to the magnitude of the nonlinear coefficients, materials which exhibit both nonlinear coefficients larger than presently known nonlinear coefficients and stable operation under diverse conditions, including high intensity incident radiation, are constantly sought.

The possibility of using organic molecules in nonlinear optical devices has generated much interest recently because a large number of molecules are available for investigation. Substituted aromatic molecules have received particular interest because studies, such as *Chemical Physics Letters* 37 519 (1976), have shown that they may exhibit large optical nonlinearities in the liquid phase. The possibility of such an aromatic molecule having large optical nonlinearities is enhanced if the molecule has donor and acceptor radicals bonded at opposite ends of the conjugated system.

One such substituted aromatic molecule that is potentially interesting from an optical device point of view is para-nitroaniline. This molecule has a large molecular hyperpolarizability, $\beta$, and is transparent at many wavelengths of interest, including 0.532 $\mu$m, which permits frequency doubling of the commonly used 1.064 $\mu$m wavelength from a Nd:YAG laser. This molecule, however, crystallizes in a centrosymmetric phase and the second harmonic coefficients are, because of the symmetry conditions, zero.

However, the nonlinear optical coefficients of several noncentrosymmetric molecules, 2-bromo-4-nitroaniline, 2-chloro-4-nitroaniline and (methyl) - (2,4-dinitrophenyl) -amino-2-propanoate, which belong to the $Pna2_1$, $Pna2_1$, and $P2_1$ space groups, respectively, and are closely related to para-nitroaniline, have been investigated. The nonlinear coefficients of the first two molecules in the crystalline phase are discussed in *Journal of Applied Physics* 43, pp. 2765–2770 (1972) and the nonlinear coefficients of the last molecule are discussed in *Journal of Applied Physics* 48, pp. 2699–2704 (1977). The largest nonlinear coefficient of the first two molecules is $d_{223}$ which has a value of 35 when measured relative to potassium dihydrogen phosphide (KDP) and the largest nonlinear coefficient of the third molecule is $d_{22}$ which has a value of approximately 36 when measured relative to the $d_{11}$ coefficient of quartz. The ratio of the nonlinear coefficients of KDP and quartz is approximately 1.3.

While characterization of materials by the magnitude of the nonlinear coefficients is useful for many purposes, materials are often more conveniently characterized by a figure of merit, $d^2/n^3$, where d is the nonlinear coefficient and n is the index of refraction. The figure of merit contains the material dependent terms characterizing the efficiency of second harmonic generation for relatively low levels of incident radiation. As an example of the magnitudes of typical figures of merit, of the three previously mentioned molecules, crystalline methyl-(2,4-dinitrophenyl)-aminopropanoate has a figure of merit 15 times larger than that of lithium niobate which is generally considered to be a good nonlinear material.

SUMMARY OF THE INVENTION

We have discovered that the nonlinear optical properties of 2-methyl-4-nitroaniline (MNA) make it a highly useful material in nonlinear devices that convert coherent optical radiation including a first frequency into coherent optical radiation including a second frequency. The nonlinear devices have means for introducing coherent radiation is a first frequency into the MNA and means for utilizing coherent radiation emitted from the MNA at a second frequency. Contemplated devices within the scope of the invention include frequency doublers, optical mixers and parametric oscillators. The means for introducing may be a Nd:YAG or GaAs laser emitting optical radiation having a wavelength near 1.0 and 0.8 $\mu$m, respectively. The means for utilizing may be a photodetector or an optical fiber. The means for introducing and for utilizing may also be prism couplers that introduce light from a laser into the nonlinear material and extract light from the nonlinear material and direct it to a photodetector, optical fiber or other devices. Wavelengths useful in devices using MNA are between approximately 0.5 $\mu$m and 2.0 $\mu$m, and optical, as used in this specification, means wavelengths between the visible and the near infrared.

The nonlinear coefficient $d_{12}$ of MNA is 5.8 times larger than the nonlinear coefficient $d_{31}$ of LiNbO$_3$. The phasematching figure of merit, $d^2/n^3$, of MNA is approximately 45 times larger than that of LiNbO$_3$. The nonlinear coefficient $d_{11}$ of MNA is 40 times larger than the corresponding coefficient in LiNbO$_3$. The figure of merit, $d^2/n^3$, of MNA is approximately 2000 times larger than that of LiNbO$_3$.

BRIEF DESCRIPTION OF THE DRAWING

FIG. 1 depicts the geometry of the 2-methyl-4-nitroaniline molecule;

FIG. 2 is a schematic representation of a representative nonlinear device using 2-methyl-4-nitroaniline as the active element; and FIG. 3 plots the transmission of a 50 $\mu$m plate of 2-methyl-4-nitroaniline as a function of wavelength.

DETAILED DESCRIPTION

FIG. 1 shows the geometry of the 2-methyl-4-nitroaniline molecule. The arrow indicates the NO$_2$—NH$_2$ direction.

FIG. 2 is a schematic representation of a representative nonlinear device using 2-methyl-4-nitroaniline (MNA) as the active element. Contemplated devices include frequency doublers, optical mixers, parametric oscillators and frequency converters.

Element 1 represents means for introducing coherent optical radiation into the MNA containing element 8. Element 1 may be a solid state laser, a prism or an optically polished surface. Element 8 converts the incident coherent radiation including a first frequency into emitted coherent radiation including a second frequency. It is contemplated that for some device applications either or both the incident and emitted radiation may have components at more than one frequency. For example, there may be three frequencies of coherent radiation with the phase-matching condition $\omega_3 n_3 = \omega_1 n_1 + \omega_2 n_2$ and the energy conservation condition $\omega_3 = \omega_1 + \omega_2$ being satisfied. $\omega$ is the frequency, n is the refractive index and the subscripts, 1, 2 and 3, refer to the lowest, middle and highest frequency, respectively. There may be two incident and one emitted wave or one incident and two emitted waves. Means for utilizing the coherent radiation 15 may be an optically transparent medium such as an optical fiber, a photodetector, means, such as a prism, for extracting light from the active element, or an optically polished surface. If a prism is used, the light may be directed to further utilization means.

In the embodiment depicted, element 1 is a solid state laser having AlGaAs layer 3, GaAs layer 5 and AlGaAs layer 7. Other solid state lasers, such as Nd:YAG, can be used depending upon the wavelength of coherent radiation desired. Layer 5 is the active layer and the source of coherent optical radiation. Glass layers 9 and 13 are on the top and bottom, respectively, of layer 11 which is the active element of the device and consists essentially of MNA. The thickness of layer 11 is chosen to insure that the phase-matching condition is satisfied. The thickness of the layer depends, in well-known fashion, on the wavelengths of the coherent radiation and the refractive indices of layers 9 and 13.

For some purposes, prism coupling will be preferred to the edge coupling embodiment depicted. A thin film configuration using prism coupling is described in U.S. Pat. No. 3,584,230.

Other embodiments of the nonlinear device using MNA are contemplated. For example, the devices might also be constructed with active element 8 consisting of bulk MNA crystals and phasematched in well-known manner such as described in *Physical Review* 145, pp. 338-379 (1966) and U.S. Pat. No. 3,965,375. Contemplated device applications are similar to those described for waveguide form devices.

Single crystals of bulk MNA useful for devices are advantageously prepared by vapor growth and a suitable vapor growth technique will be described in some detail. MNA is slightly soluble in a number of solvents, including water, and appropriate and well-known steps must be taken to protect the MNA from moisture and high humidity.

The starting material is typically commercially available 2-methyl-4-nitroaniline in the form of a yellow powder. Although the purity of such material is generally at least 98 percent, it has been found desirable to further purify the material prior to growing the crystals. An advantageous purification method is sublimation. 2-methyl-4-nitroaniline melts at a temperature of 131 degrees C and sublimation proceeds satisfactorily when the powdered material is heated to a temperature slightly below the melting temperature. The preferred temperature range extends from 115 degrees C. to 120 degrees C. with the preferred temperature being approximately 118 degrees C. A stream of an inert gas, e.g., nitrogen, passes over the material at a rate between 150 and 200 cm$^3$/min and results in the transport of purified material. Use of the preferred temperature range results in a finely divided sublimate. In the temperature range extending from 100 degrees C. to 115 degrees C., 2-methyl-4-nitroaniline was deposited as thin ribbons 20 $\mu$m to 50 $\mu$m thick, up to 0.5 cm wide and between 1 and 2 cm long. At still lower temperatures, the 2-methyl-4-nitroaniline was deposited as finely divided crystals.

The finely divided sublimate formed the source material for the thermal gradient vapor growth of bulk crystals. As an example, three grams of the sublimate were placed in a pyrex tube and heated, at a temperature below the melting point of MNA, in a horizontal furnace for an extended time period. A slight thermal gradient, approximately 0.2 degrees C/cm, has been found satisfactory, and was maintained between the ends of the tube. The hotter end was at 117 degrees C. After transport of the material to the cool end, the furnace was cooled at a rate of approximately 1 degree C./hr to approximately 80 degrees C. and then cooled to ambient temperature at the natural cooling rate of the furnace. The material deposited at the cool end had small voids but areas up to several mm on a side and 0.5 cm long were found to be void-free.

A waveguide configuration may be obtained by growing a thin, approximately 1.0 $\mu$m, single crystal of MNA using a liquid phase epitaxial growth method such as the method described in *Journal of Crystal Growth* 42, pp. 364-369 (1977). This method has been found particularly useful for growing MNA single crystals between glass layers in a waveguide configuration.

X-ray analysis was used to determine the crystal structure. The space group is monoclinic $C_s^4$ with the b axis as the unique axis, i.e., the mirror plane is perpendicular to b. There are four molecules per unit cell and the unit cell parameters are a=11.17 Angstroms; b=11.37 Angstroms, and c=7.90 Angstroms. The angle between the a and c axes is 137 degrees. The optical x, y and z axes are mutually orthogonal. The b axis is parallel to the z axis. The angle between the c axis and the x axis is approximately 68 degrees. The direction of molecular hyperpolarizability, defined to be along the NO$_2$—NH$_2$ axis, forms an angle of approximately 21 degrees from the x axis. The density was 1.477 gm/cm$^3$.

FIG. 3 shows the transmission through a 50 $\mu$m plate of MNA as a function of wavelength. Transmission is high for wavelengths within the range extending from approximately 0.5 $\mu$m to approximately 2.0 $\mu$m. Absorption near 1.0 $\mu$m was negligible and was also small near 0.5 $\mu$m. The wavelengths between approximately 0.5 $\mu$m and 2.0 $\mu$m constitute the range of optical wavelengths useful for device purpose. Small absorption at these wavelengths permits frequency doubling of radiation from a Nd-YAG laser. Small absorption near 0.8 $\mu$m permits use of coherent radiation from a GaAs laser in a parametric amplifier or oscillator. Precise measurement of the absorption coefficient was difficult because of crystal imperfections but was approximately 1 cm$^{-1}$ at 0.532 $\mu$m.

The refractive indices were measured by transmission through thin plates, typically 50 $\mu$m thick perpendicular to b, and were, at $\lambda = 0.6328$ $\mu$m, $n_x = 2.0 \pm 0.1$ $n_y = 1.6 \pm 0.1$ The nonlinear coefficients, $d_{ijk}$, allowed by $C_s^4$ and Kleinman symmetry are given by the following equations:

$$P_x = d_{11}E_x^2 + d_{12}E_y^2 + d_{13}E_z^2 + 2d_{15}E_xE_z$$

$$P_y = 2d_{24}E_yE_z + 2d_{12}E_xE_y$$

$$P_z = d_{15}E_x^2 + d_{24}E_y^2 + d_{33}E_z^2 2d_{13}E_xE_z$$

A well-known technique, Maker fringes, which is described in *Journal of Applied Physics*, 41, 1667 (1970), was used to measure the nonlinear coefficients by determining the second harmonic intensity as a function of crystal rotation relative to an incident light beam. The refractive index measurements and the Maker fringes were used to obtain the coherence length of $l_c = 0.7 \pm 0.1$ μm with $$n_x = 2.2 \ (\lambda = 0.532 \ \mu m)$$

$$n_x = 1.8 \ (\lambda = 1.064 \ \mu m)$$

$d_{11}$ coefficient: Measurement of the second harmonic intensity at the peak of the Maker fringes produced by the $d_{11}$ coefficient determined that nonlinear coefficient for 2-methyl-4-nitroaniline, relative to LiNbO$_3$ (LN), to be $$d_{11}(MNA)/d_{31}(LN) = 40 \pm 10$$

This is a large nonlinearity for a crystal transparent at $\lambda = 0.532$ μm and means that the figure of merit relative to LiNbO$_3$ $$(d_{11}^2/n^3) MNA/(d_{31}^2/n^3)LN = 2000.$$

By rotating the crystal plate about a vertical x-axis with a fundamental and harmonic polarized along the x-axis, phasematching for the $d_{11}$ coefficient was observed at an external angle of $\phi = 55$ degrees. The harmonic intensity was measured to be $1.3 \times 10^6$ times larger than that of the quartz reference. This is not the typical birefringence phasematching because the refractive index does not change with rotation. It is hypothesized that the crystal forms in layers perpendicular to the z-axis and the effective layer thickness varies as the crystal rotates until it becomes an odd multiple of the coherence length.

The harmonic power produced by the other nonlinear coefficients, $d_{33}$, $d_{133}$ and $d_{15}$, in this b plate was observed to be typically 10 of that produced by the $d_{11}$ coefficient. The large size of the $d_{11}$ nonlinearity and slight imperfections in the crystal combined to make measurement of the other coefficients impossible because the second harmonic light produced by $d_{11}$ was scattered into other polarization directions. However, the small harmonic power observed and the small coherence length of the $d_{11}$ coefficient suggest that $d_{33}$, $d_{13}$ and $d_{15}$ are, at most, several percent of $d_{11}$.

$d_{12}$ coefficient: This is the only coefficient other than $d_{11}$ that is expected to be large. The $d_{12}$ coefficient was measured by cutting a 0.89 mm thick plate perpendicular to the z-axis of a single crystal. The surfaces were then polished and a horizontally polarized fundamental which was parallel to the y-axis of the crystal plate was used as the incident radiation. Phasematching was observed by first rotating the crystal approximately 5 degrees about the y-axis and then approximately 40 degrees about the vertical axis. The harmonic intensity relative to that of the quartz Maker fringe peak was observed to be approximately $4 \times 10^6$. The phasematched refractive index measured using a wedge was found to be $n_{1\omega} = n_{2\omega} = 1.8$. The phasematchable coefficient has a figure of merit, $d^2/n^3$, relative to LiNbO$_3$ of $$(d^2/n^3)MNA/(d^2/n^3)_{LN} = 45.$$

The phasematchable figure of merit, $d_{eff}^2/n^3$, is more than an order of magnitude larger than that of the related compounds, 2-chloro-4-nitroaniline and 2-bromo-4-nitroaniline. This is due, at least in part, to be smaller intrinsic $d_{ijk}$ coefficients in the latter compounds and partly due to the reduction of $d_{eff}$ by the direction cosine factors needed for phasematching.

The optical damage threshold was measured as greater than 200 MW/cm$^2$ at $\lambda = 1.064$ μm.

We claim:

1. A device comprising a crystalline body, means for introducing coherent radiation into said crystalline body, said radiation including a first wavelength, and means for utilizing coherent radiation emitted from said crystalline body, said radiation including a second wavelength, CHARACTERIZED IN THAT said crystalline body consists essentially of 2-methyl-4-nitroaniline.

2. A device as recited in claim 1 in which said means for introducing comprises a laser.

3. A device as recited in claim 2 in which said laser is a Nd:YAG laser.

4. A device as recited in claim 2 in which said laser is an AlGaAs laser.

5. A device as recited in claim 1 in which said means for introducing and said means for utilizing are prisms.

6. A device as recited in claim 1, 3 or 5 in which said second wavelength is half of said first wavelength.

7. A device as recited in claim 1 or 5 in which said first wavelength is approximately 1.0 μm.

8. A device as recited in claim 1 or 5 in which said first wavelength is approximately 0.8 μm.

* * * * *

UNITED STATES PATENT AND TRADEMARK OFFICE
CERTIFICATE OF CORRECTION

PATENT NO. : 4,199,698

DATED : April 22, 1980

INVENTOR(S) : Clyde G. Bethea, Barry F. Levine, Robert T. Lynch, Carl D. Thurmond It is certified that error appears in the above-identified patent and that said Letters Patent are hereby corrected as shown below:

Column 5, line 49, "$d_{133}$" should read --$d_{13}$--; line 50, "10" should read --$10^{-3}$--. Column 6, line 18, "$n_{107}$" should read --$n_\omega$--; line 26, "be" should read --the--.

Signed and Sealed this

Fifth Day of August 1980

[SEAL]

Attest:

SIDNEY A. DIAMOND

Attesting Officer     Commissioner of Patents and Trademarks